United States Patent [19]

Blair et al.

[11] Patent Number: 4,669,821

[45] Date of Patent: Jun. 2, 1987

[54] RADIATION RESISTANT OPTICAL FIBER WAVEGUIDE

[75] Inventors: G. Richard Blair, Culver City; Joseph L. Pikulski, Newbury Park, both of Calif.

[73] Assignee: Hughes Aircraft Company, Los Angeles, Calif.

[21] Appl. No.: 652,236

[22] Filed: Sep. 19, 1984

[51] Int. Cl.$^4$ .............................................. G02B 6/00
[52] U.S. Cl. ................................. 350/96.34; 65/3.11; 65/3.12
[58] Field of Search ............... 350/96.34, 96.29, 96.30; 65/3.11, 3.12, 3.31

[56] References Cited

U.S. PATENT DOCUMENTS 4,243,299   1/1981   Gliemeroth ..................... 350/96.34

FOREIGN PATENT DOCUMENTS 2004270   3/1979   United Kingdom .
2029400   3/1980   United Kingdom .

OTHER PUBLICATIONS

Smith et al; "Color Centers in X-irradiated Soda-Silica Glasses"; *J. of the Amer. Ceramic Soc.;* vol. 47, No. 11; Nov. 1964; pp. 564–570.
Chemical Abstracts, vol. 100, nr. 18, 30 Apr. 1984, Columbus, Ohio, (US) see abstract nr. 143848b & JP, A, 58217450, (Nippon Telegraph and Telephone Public Corporation), 17 Dec. 1983.
Chemical Abstracts, vol. 92, nr. 24, 16 Jun. 1980, Columbus, Ohio, (US) see abstract nr. 202470p & JP, A, 79156827, (Sumitomo Electric Industries), 11 Dec. 1979.

*Primary Examiner*—William L. Sikes
*Assistant Examiner*—Robert E. Wise
*Attorney, Agent, or Firm*—A. W. Karambelas

[57] ABSTRACT

An optical fiber waveguide resistant to ionizing radiation having a glass core of predetermined refractive index surrounded by glass cladding having a lower predetermined refractive index. The glass core and glass cladding are each composed of high purity silica incorporating gallium as a constituent. The gallium is present in the form of $Ga_2O_3$ in a concentration of about 0.01 to 0.15 mole percent ratio to the silica. The glass of the optical waveguide can further include phosphorus in the form of $P_2O_5$ as an additional constituent in the amount of from about 5 to 16 mole percent ratio to the total amount of all constituents.

The waveguide of the invention is preferably manufactured by using $GaCl_3$ in combination with an internal vapor phase process to produce a silica soot (16) containing $Ga_2O_3$ on the interior surface of a high purity silica tube (10). The soot is then consolidated and the tube collapsed to form a substantially voidless solid rod preform of high purity $SiO_2$ containing $GeO_2$.

The process of manufacture is controlled so as to dispose $Ga_2O_3$ within the preform in a concentration of about 0.01 to 0.15 mole percent ratio to the total constituents of the silica preform. The process can further include the deposition of $P_2O_5$ within the preform.

21 Claims, 2 Drawing Figures

RADIATION RESISTANT OPTICAL FIBER WAVEGUIDE

BACKGROUND OF THE INVENTION

The Government has rights in this invention pursuant to Contract Number DAAG-29-80-C-0139 awarded by the Department of the Army.

This invention relates to optical waveguides and more particularly to optical fiber waveguides that are resistant to damage from ionizing radiation. The invention further relates to optical fiber waveguides comprising a predetermined percentage of $Ga_2O_3$ as a constituent in a high purity silica core.

High purity silica is of particular interest as a material for optical fiber waveguides due to its high transmission quality and inherent strength. Fibers made from pure silica exhibit excellent optical clarity and can achieve low transmission loss rates on the order of 1 to 3 decibels per kilometer (dB/km). This allows utilization of optical waveguides many kilometers long without specialized signal repeaters or amplifiers. Over short distances, such fibers provide extremely low loss, low dispersion, high volume transmission. In addition, the inherent strength of high purity silica fibers allows them to withstand long term stress without deformation. These properties make high purity silica fibers extremely useful as communication and data transmission links.

Therefore, silica optical fiber waveguides are finding use in a number of specialized applications such as long distance, secure, data links for military communications, data buses for satellite and space vehicle systems, and real time imaging systems. This latter category includes optical fiber systems for monitoring environmental and experimental conditions around nuclear reactor facilities, and optical fiber data links for plasma fusion reactors where extremely high magnetic fields degrade wire born signals.

It is known, however, that optical waveguides, including silica based fibers, are damaged by exposure to a class of radiation known as ionizing radiation. This category of radiation includes, among other things, x-rays, nuclear radiation (such as gamma rays) and high energy charged particles.

Commercial quality fibers, containing compounds other than pure silica, have been exposed to either steady state irradiation from radioisotopes or pulsed radiation from electron-beam sources and have exhibited greatly increased transmission losses. While specific optical fiber waveguides vary, exposure to a $^{60}Co$ radiation source, or a 0.5 MeV electron source, for a 1 kilorad (krad) dose typically increases transmission losses from 2 to over 10 dB/km. Radiation exposures at several krads will increase the transmission losses of a silica fiber by several hundred to several thousand dB/km. As an example, exposure to a pulse of 0.5 MeV electrons for 3 nanoseconds can increase transmission loss in a silica fiber by 200 to 3500 dB/km depending on fiber purity and other parameters.

The increase in transmission loss will diminish with a relaxation period on the order of seconds to hours after irradiation ceases. However, some permanent level of damage remains. The silica fiber of the previous example (0.5 MeV electron exposure) exhibited a decay to 30 to 200 dB/km transmission loss in a short period of 1 millisecond. Therefore, if an optical fiber waveguide is left in a radiation free environment after exposure, the damage decreases naturally as the atomic structure of the glass matrix in the fiber attempts to establish a new equilibrium value. However, it is clear that the new equilibrium state has transmission losses outside the limits for practical optical fiber systems as previously discussed (1 to 3 dB/km). Even a factor of 10 improvement to 3 to 20 dB/km would result in inadequate optical clarity.

Normally optical absorption of light traversing an optical fiber is very low because the electrons in the matrix structure are trapped in deep energy levels or valence bands. The lack of absorption follows from the fact that the energy required to excite such an electron is much greater than that of the photons. It is generally believed that ionizing radiation ionizes some of the atoms of the glass matrix which alters the electron energy levels and conduction band states. Electrons escaping shallow energy traps or shifting within the glass matrix create unpaired ion/electron and electron/hole pair sites. These sites form a continuum of energy levels. New ion sites also act as color centers, which can absorb electrons from other sites with a small increase in energy. This alteration to the glass has two principal results.

First, optical signal photons interact with trapped electrons which form the new color centers, ion cites and conductive band states of the glass by energizing electrons. This absorbs energy from the photons, in the UV-visible-near-infrared range, translating as absorbed light. This is the principal source of increased transmission losses observed in optical fiber waveguides.

Second, electrons and holes may also shift from various energy levels back into lower energy states emitting light in the process and cause an optical fiber to luminesce. This luminescence can overload photodetection stages of communication systems with unwanted bursts of radiation.

Typical low background environmental radiation on the order of 0.5 or less rads does not cause a problem. However, communication systems relying on low loss optical fibers will become inoperative after exposure to modest radiation doses on the order of 0.5 to 3 krads. Cumulative effects of long term or continuous exposure to even lower levels is potentially destructive.

From the applications previously listed, one can see that a wide variety of communication systems are planned which might be exposed to ionizing radiation. The advanced equipment on commercial satellites and space probes can expect to encounter ionizing radiation, especially in geo-syncronous orbit or beyond, and monitoring equipment for the nuclear and plasma fusion reactor environments will receive heavy exposure to nuclear radiation. In all of these situations it is imperative that the optical fiber waveguides continue to function within certain limits. Therefore, a process or apparatus is needed to prevent this type of damage to a fiber.

It has been discovered that heating an optical waveguide can "anneal" some of the damage by allowing or causing electrons in the waveguide structure to be mobile enough to realign themselves within the glass matrix and fill desired energy levels or sites in the material and not remain trapped at color centers or stress sites. Therefore, the optical fiber regains optical transparency, transmission losses decrease, and the fiber returns to useful service. A method of heating a fiber in situ for nuclear radiation environments is disclosed in U.S. Pat. No. 4,229,069 to Motin et al. Motin proposes a constant heat level to preserve the fiber but this technique can also be use to repair previously damaged fibers. However, the techniques illustrated in the Motin et al. patent require the use of extra apparatus (resistive coatings, heating sources, power sources, control equipment) to achieve a repaired fiber, unless the radiation is so extreme as to generate its own heat. Optical fiber waveguides that resist damage without any mechanical intervention would be more useful.

An alternate approach is to use a dopant that preferentially attracts the liberated electrons preventing movement of the electrons into optical trapping sites and the subsequent loss of energy from the signal photons. Several dopants are in fact already used in the manufacture of fibers for the purpose of effecting and tailoring the refractive index of the glass. This includes elements such as Ge, P, Al, and Ga. Other dopants can be added to improve fiber processing.

Commonly used dopants are not known to reduce radiation damage to optical fiber waveguides. While germanium was originally thought to be useful, further experimentation has shown increased transmission losses when used in combination with other dopants. The addition of a dopant such as cerium has been used to reduce the formation of color centers during fiber production, see U.S. Pat. No. 4,345,036, and is believed to have a radiation hardening effect. More recently, the addition of phosphorus in the form of $P_2O_5$ has been shown to decrease the transmission losses for radiation damaged fibers but in large amounts can cause ellipticity of the fiber core.

SUMMARY

With the above problems and attempted solutions in mind, it is one purpose of this invention to provide a new optical fiber waveguide that is resistant to ionizing radiation. It is another purpose of this invention to provide a process for the manufacture of an improved radiation resistant optical fiber waveguide.

In accordance with the invention, an optical fiber waveguide resistant to ionizing radiation is provided having a glass core of predetermined refractive index surrounded first by a barrier layer and then by glass cladding with a refractive index less than the core. The glass comprising the core includes gallium as a constituent in a concentration of about $10^{19}$ to $2 \times 10^{20}$ atoms per mole of atoms comprising the glass. In the preferred embodiment the gallium is present as $Ga_2O_3$ in a glass comprising high purity silica with a $Ga_2O_3$ concentration of about 0.01 to 0.15 mole percent ratio to the silica. In addition, the glasses comprising the optical fiber waveguide can contain phosphorus in the form of $P_2O_5$ as an additional constituent in a concentration of about 5 to 16 mole percent ratio to all constituents.

In a further realization of the invention, a process is provided for the manufacture of optical fiber waveguides that are resistant to damage from ionizing radiation. The process involves the steps of producing a silica soot, containing other dopants as desired, on the interior surface of a substantially pure silica tube using an internal vapor phase oxidation process; flowing $GaCl_3$ through the silica tube in conjunction with the internal vapor phase process in order to react with an oxidizing atmosphere and produce $Ga_2O_3$. $Cl_2$ produced is removed from the system by the sweeping action of carrier gases. The silica soot and $Ga_2O_3$ are consolidated and the silica tube collapsed in a final step under high heat so as to form a substantially voidless solid rod of high purity silica cladding, with a core containing $Ga_2O_3$.

During the process the internal flow of $GaCl_3$ gas is controlled by input means so as to dispose $Ga_2O_3$ with said silica soot in a ratio of about 0.01 to 0.15 mole percent. The process can further include the introduction of $POCl_3$ in order to form $P_2O_5$ which deposits with said silica soot in the ratio of less than 15 mole percent.

DETAILED DESCRIPTION

Figure 1:
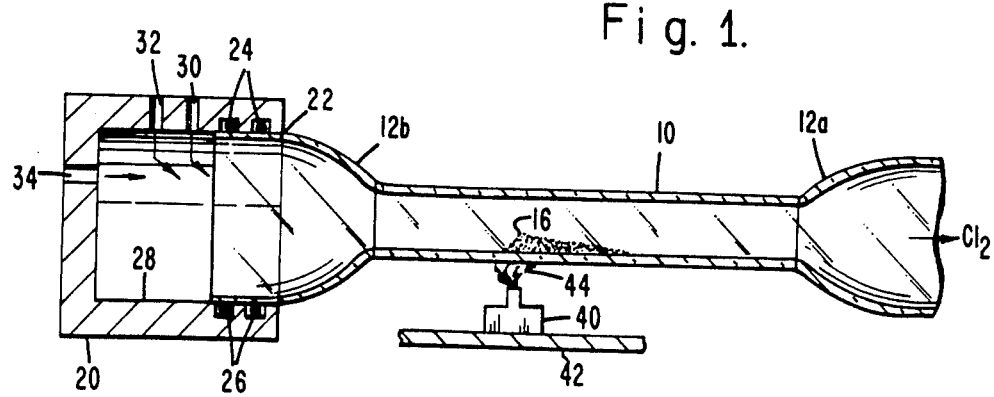
FIG. 1 is a schematic representation of the apparatus and process of the present invention.

An optical fiber waveguide typically used in the art comprises a glass core with a predetermined refractive index surrounded by a glass cladding having a refractive index less than the core. The optical fiber can also have an intermediary glass barrier layer or multiple cladding layers for some applications. The indexes of refraction are determined by material composition for the glasses including dopants as would be known in the art. The typical glass composition of an optical fiber is chosen for optimizing these indexes for the wavelength or other parameters of operation required for each application.

For the reasons previously discussed the optical fiber waveguide of the present invention uses high purity silica as the basic glass material for the core. In addition, although not necessary for purposes of the invention, the preferred embodiment employs a barrier layer of high purity silica glass between the core and cladding. This barrier improves the propagation of light in the core due to decreased attenuation of evanescent waves by the cladding.

The optical waveguide of the present invention comprises a predetermined percentage of gallium as a constituent in the high purity silica glass core. The gallium is present in a concentration of from $10^{19}$ to $2.0 \times 10^{20}$ atoms per mole of silica atoms. This concentration range is used in order to be about the same as the number of absorbing sites and color centers previously discussed.

The relative concentration of such color centers and sites is predicted to be on the order of $10^{19}$ to $10^{20}$ sites per $10^{23}$ (or mole) of silica atoms. The concentration of gallium, however, is determined in relation to a mole equivalent of all constituents in the glass since dopants such as Ge or P can be used in the silica for refractive index control, etc. The actual concentration of color centers or altered ion sites is a small fraction of the total number of atoms in the glasses comprising the optical fiber waveguide. However, only a small change is needed to absorb a significant number of photons to affect large transmission losses. The gallium is present in sufficient quantity to preferentially absorb electrons and prevent photon absorption as previously discussed.

It is also possible to employ gallium in the barrier layer of the preferred embodiment if desired for particular applications. Generally the radiation damage to this layer is not as critical to transmission losses as that of the core.

Silica based optical fiber waveguides are currently manufactured using a variety of techniques and chemical compositions. The optical fiber of the invention must, however, contain gallium within the desired concentration range and should not add any additional elements which either hinder radiation resistance or adversely affect optical properties of the fiber.

The preferred embodiment for the invention utilizes gallium in the form of $Ga_2O_3$ as a preferred compound incorporated within the glass matrix. This gallium compound is highly compatible with preferred processing techniques for advanced optical fibers. To meet the requirement of $10^{19}$ to $2.0 \times 10^{20}$ gallium atoms per mole concentration, care is taken to use about 0.01 to 0.15 molar percent ratio of $Ga_2O_3$ to silica. Larger quantities of $Ga_2O_3$ may impact on the index of refraction in the same manner as material like Al. In many applications such an alteration of the refractive index of otherwise pure silica is not useful. Even larger quantities on the order of several molar percent could eventually create dislocations in the matrix that fail to aid radiation resistance and can actually become degrading color centers.

The preferred method of manufacture for an optical waveguide of the invention is by drawing from a fiber preform as known in the art.

A conventional preform comprises a glass rod or column that can be manufactured by several techniques known in the art such as outside vapor phase, inside vapor phase, or solid rod insertion. The preferred embodiment for realizing an optical fiber of the present invention is that of an improved internal vapor phase process which employs $GaCl_3$ as a process gas.

The IVPO process as used in the art utilizes the principal of vapor phase oxidation. In this process oxidizable vapors or gases are delivered to a reaction zone, where they are heated in the presence of oxygen and converted to a metal oxide soot. The soot is then consolidated or fused to form a high-purity glass.

The typical reaction for silica is:

$$SiCl_4 + O_2 \rightarrow SiO_2 + 2Cl_2 \quad (1)$$

The reaction chamber itself is generally high purity material or material having a predetermined property for an outer waveguide cladding, as it becomes part of the final glass preform.

FIG. 1 provides a schematic overview of apparatus used in the IVPO process of the invention for manufacturing an optical fiber waveguide preform. The figure presents the process in general and does not fully detail internal vapor phase apparatus which can be constructed by one skilled in the art nor depict exact scale.

Turning now to FIG. 1, a reaction chamber 10 in which the process of the invention takes place is secured between two adapters 12. Reaction chamber 10 can be, but is not limited to, a high purity optical quality glass. The exact material used is dependent on the properties, such as clarity or tensile strength, desired for the outer cladding or surface of the preform being produced. The preferred reaction chamber is a high purity silica tube which will minimize the presence of impurities in the final preform matrix. This in turn minimizes the formation or expansion of fractures such as Griffith cracks.

The diameter of the silica tube used for reaction chamber 10 is determined by both the final preform composition and process parameters. An optical fiber waveguide is required to have certain predetermined core, barrier layer, and cladding dimensions depending on its intended application. This in turn dictates required quantities of core, barrier layer and cladding materials. As explained further below, reaction chamber 10 becomes the cladding in the fiber preform and in the optical fiber upon drawing. Therefore, reaction chamber 10 must be composed of a predetermined quantity of material in ratio to the quantity of core and barrier layer materials, provided by the process, to form a desired optical fiber preform. Thus, the diameter of reaction chamber 10 is determined in conjunction with the thickness of its walls to yield the desired quantity of cladding material.

The starting diameter of the tube used for reaction chamber 10 may, however, be smaller than a preferred working size for ease of handling. For a sufficiently long silica tube with thick walls, the ends of reaction chamber 10 could be heated and expanded to form a larger diameter interface. In the preferred embodiment, adapters 12a and 12b are provided to effectively alter the size of the ends of reaction chamber 10 to facilitate sizing and interfacing. This is a less complicated process than altering chamber 10 directly and assures a more precise interface.

Adapters 12a and 12b comprise sections of glass tubing that narrow down to the diameter of reaction chamber 10 on one end. The adapters are bonded to reaction chamber 10 by means known in the art, such as heating the edges to a molten state. Adapters 12 are not required to be made of high purity material because they are removed from the fiber preform prior to the drawing process and do not become part of the fiber.

Adapter 12b is supported by a rotation means which is not shown for clarity in presenting inventive features. The rotation means provides the mechanism by which reaction chamber 10 is rotated during the processing steps described below and consists of apparatus known in the art. A typical rotation means is a rotating glass lathe for supporting reaction chamber 10 and similar glass tubes although other apparatus can be employed.

Returning to FIG. 1, adapter 12b is inserted into a cylindrical opening 22 of a process manifold 20. There are two 'O-rings' 24 positioned within recesses 26 at different longitudinal positions along cylindrical wall 28. Adapter 12b rests on these O-rings which seal the space between the adapter and cylindrical wall 28 of manifold 20. The O-rings provide a reasonably gas tight seal but are not so tightly restrictive that adapter 12b and therefore reaction chamber 10 can not be rotated within cylindrical opening 22.

Manifold 20 can be constructed from a variety of materials as known in the art. However, the preferred embodiment utilizes a block of polytetrafluoroethylene as the material for manifold 20. Included in manifold 20 are several input ports 30, 32, and 34 through which feedstock gases for the IVPO process of the invention are introduced. These ports are representative of certain functions which can be divided into many ports manifolded together, such as 30a, 30b, 30c, if desired.

A burner 40 is provided along with translation means 42 for heating reaction chamber 10 at selected positions along its length while being rotated by the rotation means. Burner 40 is of the high heat hydrogen-oxygen flame (44) type as generally used in such processes, with its fuel source not shown for clarity. The burner can be subdivided into small flame producing nozzles which focus several flames 44 about the circumference of reaction chamber 10 to reduce temperature gradients.

A gas or vapor source (not shown) containing semiconductor grade or high purity, gaseous, $SiCl_4$ and dopants as required is connected to reaction chamber 10 by port 30. A source of oxidizing gas (not shown) such as, but not limited to an $O_2$ source, is connected by port 32. Alternately, both gases can be delivered through a single port 30 by various gas flow control systems known in the art. These two gases provide a feedstock gas flow through reaction chamber 10 for producing $SiO_2$ in accordance with Equation 1 above.

Burner 40 passes along the length of reaction chamber 10, heating the input gases locally inside chamber 10 and produces a thin layer of soot 16. The soot is generated downstream (direction of gas flow) of the burner and collects there. Subsequent passes of the burner along chamber, adjacent to a soot deposit, consolidates the soot so that generally no further consolidation step is required.

During the deposition of $SiO_2$ soot, the process for practicing the invention requires the simultaneous deposition of gallium in an amount sufficient to prevent radiation degradation as previously discussed. The preferred process utilizes the oxidizing atmosphere of reaction chamber 10 to produce the compound $Ga_2O_3$ which deposits along with the $SiO_2$ soot. As such the two oxides readily consolidate together into a single glass matrix during processing.

A source of high purity gaseous $GaCl_3$ (not shown) is connected to reaction chamber 10 through port 34. A representative source is a container of $GaCl_3$ which is heated in the presence of a flowing carrier gas. The $GaCl_3$ is pyrolized by flame 40 in the oxidizing atmosphere of chamber 10 to form $Ga_2O_3$ and $Cl_2$. The flow of the $GaCl_3$ gas is controlled by means known in the art, so that the ratio of the two gases flowing through reaction chamber 10 produces on the order of 0.01 to 0.15 percent $Ga_2O_3$ to $SiO_2$ by molar weight. In the representative $GaCl_3$ source above, the concentration of $GaCl_3$ is controlled by altering the temperature of the container.

When dopants are also added to the reaction process for refractive index control or the like, the molar ratio of $Ga_2O_3$ must be computed from the molar weight of all the constituents in the preform, ignoring the outer silica reaction chamber where appropriate.

The $Cl_2$ gas that is released during the process flows out of reaction chamber 10 through adapter 12b where it can be collected by various apparatus such as a simple gas hood or pump.

During the inside vapor process, the barrier layer is deposited first, followed by the core glass. When a predetermined thickness of silica soot (16) containing $Ga_2O_3$ has been deposited, with appropriate ratio of core to barrier layer and cladding materials, the heat from burner 40 is increased. Burner 40 raises the temperature of reaction chamber 10 to around 2300° C. causing it to soften and thoroughly collaspe, forming a substantially solid perform rod. a this point the glass of adapters 12 and 12b are removed by heating or cutting.

It is to be noted that the step of collapsing the reaction chamber or silica tube to form a rod requires care so as to produce a very circular preform. The presence of large amounts of phosphorus or $P_2O_5$ has been found to impact on this step and make the production of substantially circular rods difficult. As previously mentioned phosphorus has been found to be of some benefit as a dopant for radiation resistance. However, the use of gallium as a radiation resistant dopant allows less phosphorus to be introduced as a resistance dopant and circularity of the preform is maintained.

The preform rod produced by the process of this invention is composed of a high purity silica glass core having some desired dopants surrounded by a silica barrier layer and then a cladding. Thus a preform from which an optical fiber waveguide of the present invention is drawn is manufactured.

EXAMPLE

Figure 2:
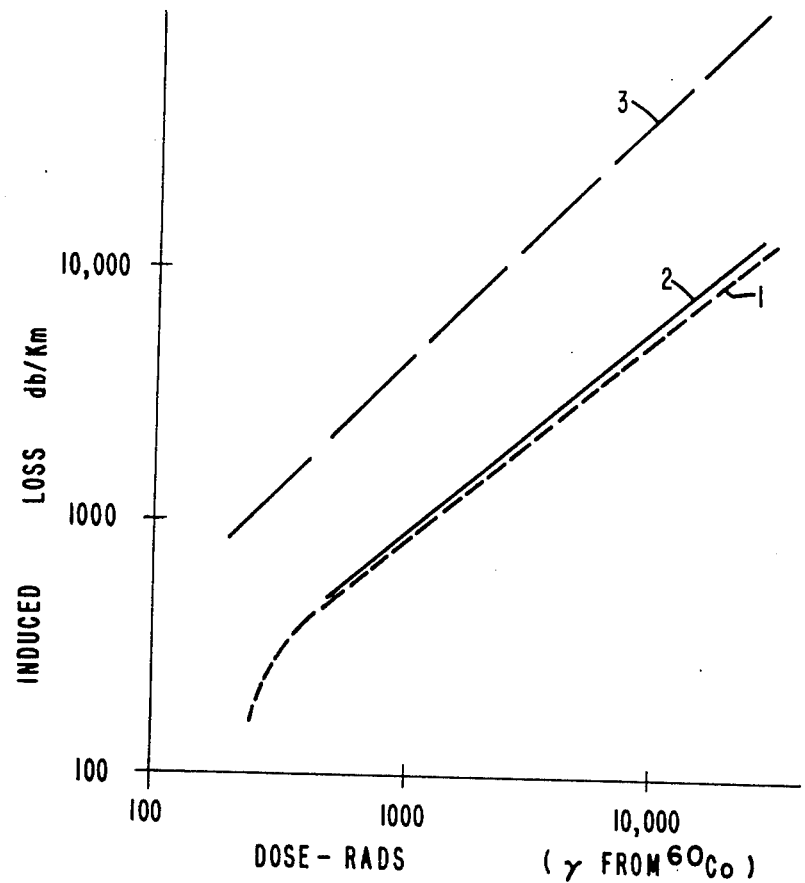
FIG. 2 is a graphic plot of the radiation damage characteristics of an optical fiber waveguide of the invention and other representative optical fiber waveguides.

The above process was used to manufacture an optical fiber waveguide having a $Ga_2O_3$ concentration of approximately 0.03% by molar ratio to the silica and then irradiated to verify its resistance to damage. FIG. 2 is a graphic plot of data taken from testing of this fiber as compared to some other fibers of known composition. A low phosphorus optical fiber waveguide containing gallium is labeled as number 1. A silica fiber containing high $P_2O_5$ is labeled number 2 and a plain, low phosphorus, silica fiber is labeled number 3. The plot represents the transmission loss of the fibers as compared to irradiation dose, in kilorads, from a $^{60}Co$ source.

The foregoing description of preferred embodiments of the invention has been presented for purposes of illustration and description. It is not intended to be exhaustive nor to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What is claimed is:

1. An optical fiber waveguide resistant to damage from ionizing radiation having a glass core of predetermined refractive index, said core being surrounded by at least one glass cladding having a predetermined refractive index less than said core, comprising:
    gallium as a constituent of said glass core in a concentration between about $10^{19}$ to $2.0 \times 10^{20}$ atoms per mole of atoms comprising said glass core.

2. An optical fiber waveguide as recited in claim 1 wherein said glass core comprises high purity silica.

3. An optical fiber waveguide as recited in claim 2 further comprising at least one dopant in said silica for affecting the refractive index of said core.

4. An optical fiber waveguide as recited in claim 2 wherein said gallium atoms are present in said glass core in the form of $Ga_2O_3$.

5. An optical fiber waveguide as recited in claim 4 wherein said $Ga_2O_3$ has a concentration of about 0.01 to 0.15 mole percent ratio to said silica.

6. An optical fiber waveguide as recited in claim 4 wherein the concentration of said $Ga_2O_3$ is from about 0.05 to 0.10 mole percent ratio to said silica.

7. An optical fiber waveguide of claim 1 wherein said core further comprises:
    phosphorus in the form of $P_2O_5$ as an additional constituent in a concentration of about 5 to 16 mole percent ratio to the total amount of all constituents comprising said glass core.

8. An optical fiber waveguide as recited in claim 1 further including a barrier layer glass disposed between said core and said cladding.

9. An optical waveguide as recited in claim 8 wherein said barrier layer glass comprises high purity silica containing gallium as a constituent in a concentration of about $10^{19}$ to $2.0 \times 10^{20}$ atoms per mole of material comprising said barrier.

10. A process for the manfacture of radiation resistant optical fiber waveguide having a glass core of high purity silica of predetermined refractive index surrounded by at least one glass cladding having a predetermined refractiive index less than said core comprising the step of providing said core with an amount of gallium between about $10^{19}$ to $2.0 \times 10^{20}$ atoms per mole of atoms comprising said core,
   whereby said waveguides are made resistant to damage ionizing radiation.

11. The process of claim 10 wherein said core comprises high purity soda-free silica.

12. The process of claim 11 wherein said step of providing gallium comprises providing gallium in a concentration of about $10^{19}$ to $2.0 \times 10^{20}$ atoms per mole of atoms comprising said core.

13. The process of claim 12 wherein said step of providing gallium comprises providing said gallium in the form of $Ga_2O_3$.

14. The process of claim 13 wherein said step of providing $Ga_2O_3$ comprises providing $Ga_2O_3$ in a concentration of about 0.03 to 0.15 mole percent ratio to said silica.

15. A process for the manufacture of optical fiber waveguides that are resistant to damage from ionizing radiation comprising the steps of:

producing a soot on the interior surface of a high purity silica tube using an internal vapor oxidation process;

flowing $GaCl_3$ through said tube contemperaneously with said soot production so as to react with an oxidizing gas in said tube and produce $Ga_2O_3$;

consolidating said soot and $Ga_2O_3$ as part of the interval vapor phase process; and collapsing said silica tube under high heat so as to form a substantially voidless solid preform rod of high purity silica containing $Ga_2O_3$.

16. The process of claim 15 wherein the step of flowing said $GaCl_3$ gas is controlled by input means so as to dispose $Ga_2O_3$ with said silica soot in a predetermined concentration of about 0.01 to 0.15 mole percent ratio.

17. The process of claim 15 wherein step of flowing said $GaCl_3$ gas is controlled by input means so as to dispose $Ga_2O_3$ with said silica soot in a predetermined concentration of about 0.05 to 0.10 mole percent ratio.

18. The process of claim 15 wherein the step of producing a soot further includes the step of producing silica soot containing at least one dopant for refractive index control.

19. The process of claim 18 wherein said dopant is germanium.

20. The process of claim 15 further including the step of flowing the $POCl_3$ through said silica tube in the presence of an oxidizing gas so as to form $P_2O_5$ which deposits with said silica soot.

21. The process of claim 20 wherein the step of flowing $POCl_3$ is controlled so as to deposit $P_2O_5$ within said silica tube in a concentration of less than 15 mole percent ratio to said $Ga_2O_3$ and silica.

* * * * *